United States Patent
Nam et al.

(10) Patent No.: US 9,740,042 B2
(45) Date of Patent: Aug. 22, 2017

(54) LENS FOR BACKLIGHT OF DISPLAY DEVICE AND BACKLIGHT OF DISPLAY DEVICE INCLUDING THE SAME

(71) Applicant: Samsung Display Co., Ltd., Yongin, Gyeonggi-Do (KR)

(72) Inventors: Ji Eun Nam, Seoul (KR); Young-Min Park, Hwaseong-si (KR); Seok Hyun Nam, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 188 days.

(21) Appl. No.: 14/265,480

(22) Filed: Apr. 30, 2014

(65) Prior Publication Data
US 2015/0109764 A1    Apr. 23, 2015

(30) Foreign Application Priority Data
Oct. 22, 2013  (KR) .......................... 10-2013-0126047

(51) Int. Cl.
| | | |
|---|---|---|
| G09F 13/04 | (2006.01) | |
| G02F 1/1335 | (2006.01) | |
| G02B 19/00 | (2006.01) | |

(52) U.S. Cl.
CPC ... G02F 1/133526 (2013.01); G02B 19/0028 (2013.01); G02B 19/0061 (2013.01); G02B 19/0071 (2013.01); G02F 1/133603 (2013.01); G02F 2001/133607 (2013.01)

(58) Field of Classification Search
CPC ..... F21V 5/04; F21K 9/50; F21K 9/00; F21K 9/58; G02F 1/015; G02F 1/21; G02F 1/133603; G02F 1/133526; G02F 2001/133607; G02F 2/002; F21Y 2101/02; G02B 19/0028; G02B 19/0061; G02B 19/0071
USPC ...................... 362/97.3, 331–340, 610, 613; 359/592–594, 596, 598, 798
See application file for complete search history.

(56) References Cited

U.S. PATENT DOCUMENTS

| | | | |
|---|---|---|---|
| 7,489,453 B2* | 2/2009 | Chinniah | F21S 48/1233 359/718 |
| 7,524,098 B2 | 4/2009 | Vennetier et al. | |
| 7,537,368 B2 | 5/2009 | Mizuyoshi | |
| 7,549,781 B2 | 6/2009 | Kim et al. | |
| 8,177,391 B2 | 5/2012 | Ryu et al. | |
| 8,292,466 B2* | 10/2012 | Huang | F21V 5/04 362/308 |

(Continued)

FOREIGN PATENT DOCUMENTS

| | | | |
|---|---|---|---|
| JP | 10-276298 A | | 10/1998 |
| KR | 20060055706 A | * | 5/2006 |

(Continued)

OTHER PUBLICATIONS

Espacenet KR 20060055706 A English translation.*

*Primary Examiner* — Evan Dzierzynski
*Assistant Examiner* — Omar Rojas Cadima
(74) *Attorney, Agent, or Firm* — Cantor Colburn LLP (57) ABSTRACT

A lens for a backlight of a display device, includes a lower surface, a groove portion defined recessed from the lower surface and comprising a curved surface; and an upper surface comprising an outer edge and a center, in a plan view, of which a distance from the lower surface decreases in a direction from the outer edge to the center.

20 Claims, 3 Drawing Sheets

(56) References Cited

U.S. PATENT DOCUMENTS

| | | | |
|---|---|---|---|
| 8,434,910 B2* | 5/2013 | Kim | H01L 33/58 |
| | | | 257/98 |
| 2008/0291688 A1* | 11/2008 | Higashi | F21S 48/1159 |
| | | | 362/516 |
| 2008/0297918 A1 | 12/2008 | Park et al. | |
| 2010/0171690 A1* | 7/2010 | Park | G09G 3/3413 |
| | | | 345/102 |
| 2011/0163334 A1 | 7/2011 | Krijn et al. | |

FOREIGN PATENT DOCUMENTS

| KR | 102010091613 A | 8/2010 |
|---|---|---|
| KR | 2011-009052 A | 1/2011 |
| KR | 101221066 B1 | 1/2013 |
| KR | 1020130016102 A | 2/2013 |

\* cited by examiner

LENS FOR BACKLIGHT OF DISPLAY DEVICE AND BACKLIGHT OF DISPLAY DEVICE INCLUDING THE SAME

BACKLIGHT OF DISPLAY DEVICE INCLUDING THE SAME

This application claims priority to Korean Patent Application No. 10-2013-0126047 filed on Oct. 22, 2013, and all the benefits accruing therefrom under 35 U.S.C. §119, the entire contents of which are incorporated herein by reference.

BACKGROUND (a) Field

The invention relates to a lens for a backlight of a display device, and a backlight of a display device including the same. More particularly, the invention relates to a lens for a backlight of a display device in which color separation and color blurring are reduced or effectively prevented, and a backlight of a display device including the same.

(b) Description of the Related Art

Display devices are employed in a computer monitor, a television, a mobile phone and the like which are widely used electronic display devices. The display devices include a cathode ray tube display device, a liquid crystal display, a plasma display device, and the like.

The liquid crystal display, which is one of the most common types of flat panel displays, includes two display panels in which field generating electrodes such as a pixel electrode and a common electrode are disposed, and a liquid crystal layer that is interposed between the two display panels. The liquid crystal display generates an electric field in the liquid crystal layer by applying voltages to the field generating electrodes, and determines the orientation of liquid crystal molecules of the liquid crystal layer by the generated electric field, thus controlling polarization of incident light so as to display images.

Such a liquid crystal display is not self-emissive, and therefore the liquid crystal display employs a backlight including a light source to generate light. The light source may be an additionally provided artificial light source and/or natural light. An artificial light source used in the liquid crystal display may include a light emitting diode ("LED"), a cold cathode fluorescent lamp ("CCFL") and an external electrode fluorescent lamp ("EEFL").

To improve color reproducibility of the backlight, a technique of disposing a plurality of LED chips as one package has been used. However, the light of different colors emitted from the plurality of LED chips are separated such that a color separation phenomena in which the light is emitted and separated may be generated, and as a result, color blurring may occur.

SUMMARY

One or more exemplary embodiment of the invention provides a lens for a backlight of a display device, and a backlight of a display device including the same.

A lens for a backlight of a display device includes a lower surface; a groove portion defined recessed from the lower surface and including a curved surface; and an upper surface facing the lower surface and including an outer edge and a center, in a plan view, of which a distance from the lower surface decreases in a direction from the outer edge to the center.

The curved surface of the groove portion may include at least three curved portions.

The curved surface of the groove portion may include a first curved portion at a center of the groove portion, a second curved portion at a first side of the first curved portion, and a third curved portion at a second side opposite to the first side of the first curved portion.

A distance from a distal end of the first curved portion to a plane in which the lower surface is disposed, is less than a distance from a distal end of the second curved portion and the third curved portion to the plane in which the lower surface is disposed.

A plane shape of the lens for the backlight of the display device may be a circular shape or a bar shape.

A backlight of a display device includes: a lens including a lower surface; a groove portion defined recessed from the lower surface and including a curved surface; and an upper surface facing the lower surface and including an outer edge and a center, in a plan view, of which a distance from the lower surface decreases in a direction from the outer edge to the center; and a light-emitting device in the groove portion.

The curved surface of the groove portion may include at least three curved portions.

The curved surface of the groove portion may include a first curved portion at a center of the groove portion, a second curved portion at a first side of the first curved portion, and a third curved portion at a second side opposite to the first side of the first curved portion.

A distance from a distal end of the first curved portion to a plane in which the lower surface is disposed, is less than a distance from a distal end of the second curved portion and the third curved portion to the plane in which the lower surface is disposed.

The light-emitting device may include a first light emitting diode ("LED") chip and a second LED chip.

The light-emitting device may further include a phosphor on the second LED chip.

The first LED chip may be a green LED chip, the second LED chip may be a blue LED chip, and the phosphor may be a red phosphor.

A boundary between the first curved portion and the second curved portion may be within a radius of about 500 micrometers (μm) from a center of the first LED chip.

The boundary between the first curved portion and the second curved portion may be at a center of the first LED chip.

A boundary between the first curved portion and the third curved portion may be within a radius of about 500 μm from a center of the second LED chip.

The boundary between the first curved portion and the third curved portion may be at a center of the second LED chip.

A center of the first curved portion may be within a radius of about 500 μm from a center defined between the first LED chip and the second LED chip.

The center of the first curved portion may be at the center defined between the first LED chip and the second LED chip.

A plane shape of the lens may be circular.

A plane shape of the lens and the groove portion may be a bar shape, and the backlight may further include a plurality of light-emitting devices in the groove portion.

One or more exemplary embodiment of the lens for the backlight of the display device and the backlight of the display device including the same has the following effect.

One or more exemplary embodiment of the lens for the backlight of the display device and the backlight of the display device including the same may reduce or effectively prevent color separation and color blurring.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. As used herein, the term "and/or" includes any and all combinations of one or more of the associated listed items. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

Now, an exemplary embodiment of a backlight of a display device according to the invention will be described with reference to accompanying drawings.

Figure 1:
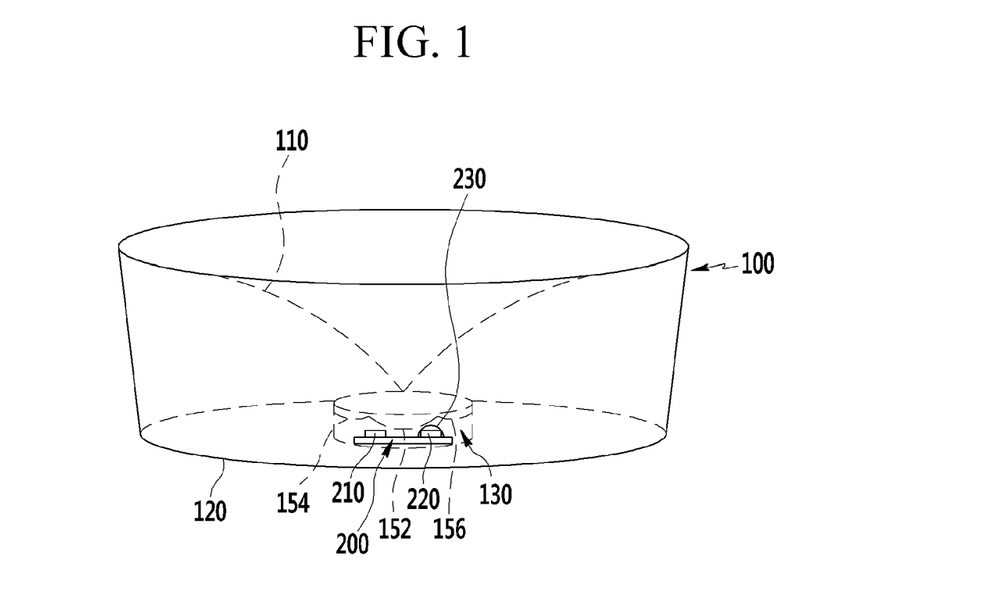
FIG. 1 is a perspective view of an exemplary embodiment of a backlight of a display device according to the invention.
Figure 2:
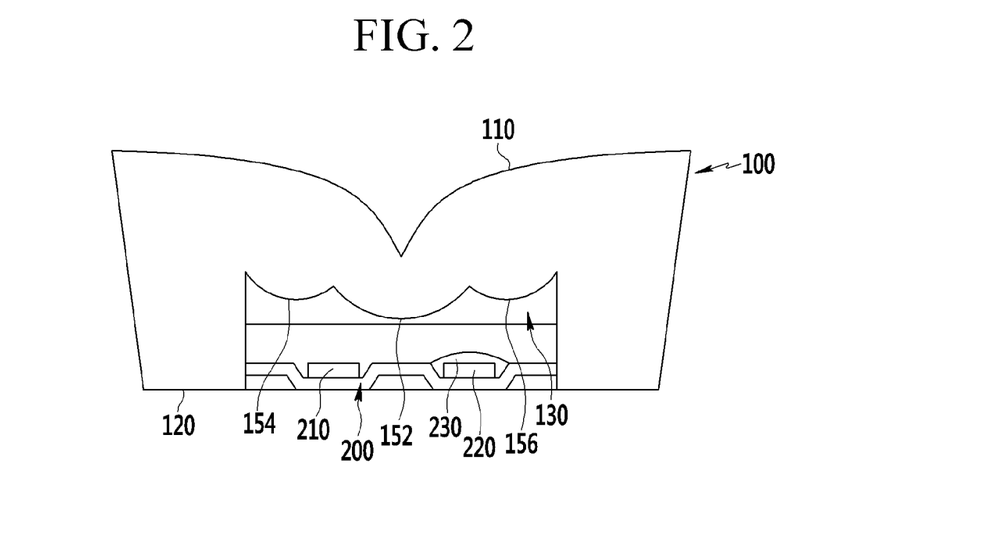
FIG. 2 is a cross-sectional view of the exemplary embodiment of a backlight of a display device according to the invention.

FIG. 1 is a perspective view of an exemplary embodiment of a backlight of a display device according to the invention, and FIG. 2 is a cross-sectional view of the exemplary embodiment of a backlight of a display device according to the invention.

A backlight of a display device includes a lens 100, and a light-emitting device 200 emitting light. The lens 100 has an approximate cylinder or truncated circular cone shape. A groove portion 130 is defined at a lower surface of the lens 100, and the light-emitting device 200 is positioned in the groove portion 130.

As shown in the illustrated exemplary embodiment, the lens 100 may have a form of the truncated circular cone of which the outer edge of the upper surface 110 and the lower surface 120 has a circular shape in a plan view, and a diameter of the lower surface 120 thereof is smaller than a diameter of the upper surface 110 thereof. Further, the shape of the lens 100 is not limited thereto, and the shape may be a truncated circular cone of which the diameter of the upper surface 110 thereof is smaller than the diameter of the lower surface 120 thereof, or the shape of the lens may be a cylinder instead of the truncated circular cone.

The upper surface 110 of the lens 100 is not planar, and has a shape of which the surface is lowered in a direction closer to the center of the lens from the outer edge. That is, in a cross-section, the upper surface 110 of the lens 100 has a concave shape. The center of the upper surface 110 of the lens 100 is most deeply indented from a plane in which the outer edge of the upper surface 110 is disposed. A cross-sectional thickness of the lens 100 may decrease in a direction from the outer edge of the upper surface 110 to the center of the upper surface 110. A distance from the upper surface 110 to a plane in which the lower surface 120 is disposed, may decrease from the outer edge of the upper surface 110 to the center thereof.

The lower surface 120 of the lens 100 may be planar except for the groove portion 130. The groove portion 130 may have a shape of an approximate cylinder or truncated circular cone, which is recessed from a plane in which the outer edge of or the planar portion thereof is disposed. In a cross-section, a ceiling of the groove portion 130 closest to the upper surface 110, has a curved profile. The collective surface of ceiling of the groove portion 130 may have at least three curved portions 152, 154 and 156. In the illustrated exemplary embodiment, for example, the collective surface of the groove portion 130 has a first curved portion 152 positioned at the center of the groove portion 130, and a second curved portion 154 and a third curved portion 156 positioned at opposite sides of the first curved portion 152. Referring to FIGS. 1 and 2, the second curved portion 154 is positioned at the left side of the first curved portion 152 and the third curved portion 156 is positioned at the right side of the first curved portion 152. The center of the first curved portion 152 may accord or be aligned with the center of the upper surface 110 of the lens 100.

A height of the first curved portion 152 taken from the plane in which the outer edge of the lower surface 120 of the lens 100 is disposed, is smaller than a height of the second curved portion 154 taken from the plane in which the outer edge of the lower surface 120 is disposed. Also, the height of the first curved portion 152 is smaller than a height of the third curved portion 156 taken from the plane in which the outer edge of the lower surface 120 is disposed. The height of the second curved portion 154 may be substantially the same as the height of the third curved portion 156. In the above, the heights of the first curved portion 152, the second curved portion 154 and the third curved portion 156 taken from a plane in which the outer edge of the lower surface 120 is disposed, means a shortest distance from an extension line of the plane to the first curved portion 152, the second curved portion 154 and the third curved portion 156 in a vertical direction, respectively. The heights may be defined with reference to the distal ends of the first curved portion 152, the second curved portion 154 and the third curved portion 156.

The light-emitting device 200 includes a first light-emitting diode ("LED") chip 210 and a second LED chip 220. The first LED chip 210 and the second LED chip 220 may emit light of different colors. In one exemplary embodiment, for example, the first LED chip 210 may be a green LED chip, and the second LED chip 220 may be a blue LED chip.

The light-emitting device 200 may further include a phosphor 230, and the phosphor 230 may be positioned on the second LED chip 220. The initial color of the light emitted from the second LED chip 220 is changed by the phosphor 230. In one exemplary embodiment, for example, the phosphor 230 may be configured as a red phosphor.

Where the phosphor 230 is configured as a red phosphor, initial blue light emitted from the second LED chip 220 is changed into a magenta light by passing through the phosphor 230. The green light emitted from the first LED chip 210 and the magenta light emitted from the second LED chip 220 and passed through the phosphor 230 are uniformly mixed while passing through the lens 100 thereby expressing white light.

In the above-described exemplary embodiment, the first LED chip 210 is the green LED, the second LED chip 220 is the blue LED chip, and the phosphor 230 is the red phosphor, however, the invention is not limited thereto. To express the white light when the light emitted from the first LED chip 210 and the light emitted from the second LED chip 220 are uniformly mixed, the colors of the first LED chip 210, the second LED chip 220, and the phosphor 230 may be variously changed.

Also, in the above-described exemplary embodiment, the collectively curved surface of the groove portion 130 includes the three curved portions 152, 154 and 156, however, the invention is not limited thereto. The collective curved surface of the groove portion 130 may have four or more curved portions. The number of curved portions is changed according to the number of the LED chips within one light-emitting device 200. In exemplary embodiments, the number of curved portions of the collective curved surface of the groove portion 130 is more than the number of LED chips by one.

Hereafter, a condition of uniformly mixing the light of different colors passing through the lens 100 to not generate the color separation will be described.

A boundary between the first curved portion 152 and the second curved portion 154 is substantially positioned at the center of the first LED chip 210. In one exemplary embodiment, the boundary between the first curved portion 152 and the second curved portion 154 is aligned with the center of the first LED chip 210. However, the boundary between the first curved portion 152 and the second curved portion 154 may be positioned within a radius of about 500 micrometers (μm) from the center of the first LED chip 210, in the plan view.

A boundary between the first curved portion 152 and the third curved portion 156 is substantially positioned at the center of the second LED chip 220. In one exemplary embodiment, the boundary between the first curved portion 152 and the third curved portion 156 is aligned with the center of the second LED chip 220. However, the boundary between the first curved portion 152 and the third curved portion 156 may be positioned within a radius of about 500 μm from the center of the second LED chip 220, in the plan view.

Next, a light progressing direction in an exemplary embodiment of a backlight of a display device according to the invention will be described with reference to FIG. 3.

Figure 3:
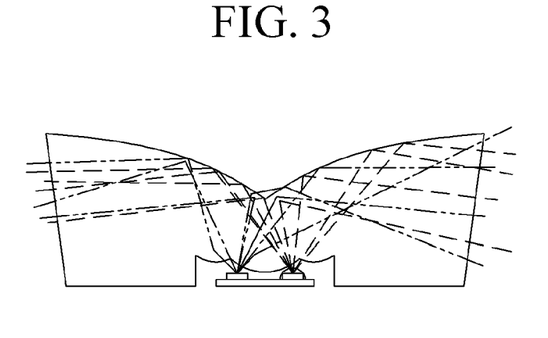
FIG. 3 is a simulation result showing a light progressing direction in the exemplary embodiment of a backlight of a display device according to the invention.

FIG. 3 illustrates a simulation result showing a light progressing direction in an exemplary embodiment of a backlight of a display device according to the invention. The light emitted from the first LED chip 210 is indicated by a two-point chain line, and the light emitted from the second light emitting diode (LED) chip 220 is indicated by a dashed line.

Firstly, a portion of the light emitted from the first LED chip 210 is emitted toward the right side of the lens 100 through the first curved portion 152, and the remaining portion thereof is emitted toward the left side of the lens 100 through the second curved portion 154. In the illustrated exemplary embodiment, the boundary between the first curved portion 152 and the second curved portion 154 substantially accords with the center of the first LED chip 210 such that about half of the light emitted from the first LED chip 210 is emitted toward the right of the lens 100 through the first curved portion 152 and the remaining half is emitted toward the left side of the lens 100 through the second curved portion 154. That is, the light emitted from the first LED chip 210 may be equally divided at the right side and the left side of the lens 100.

Secondly, a portion of the light emitted from the second LED chip 220 is emitted toward the left side of the lens 100 through the first curved portion 152 and the remaining portion thereof is emitted toward the right side of the lens 100 through the third curved portion 156. In the illustrated exemplary embodiment, the boundary between the first curved portion 152 and the third curved portion 156 substantially accords with the center of the second LED chip 220 such that about half of the light emitted from the second LED chip 220 is emitted toward the left of the lens 100 through the first curved portion 152 and the remaining half is emitted toward the right side of the lens 100 through the third curved portion 156. That is, the light emitted from the second LED chip 220 may be equally divided at the left side and the right side of the lens 100.

In one exemplary embodiment, for example, it is assumed that the light emitted from the first LED chip 210 is green light, and the light emitted from the second LED chip 220 and passing through the phosphor 230 is magenta light. Half of the green light emitted from the first LED chip 210 towards the left side of the lens 100 and half of the magenta light emitted from the second LED chip 220 and passing through the phosphor 230 towards the left side of the lens are uniformly mixed such that the light emitted at the left side of the lens 100 is represented as white light. Also, the remaining half of the green light emitted from the first LED chip 210 towards the right side of the lens 100 and the remaining half of the magenta light emitted from the second LED chip 220 and passing through the phosphor 230 towards the right side of the lens 100 are uniformly mixed such that the light emitted at the right side of the lens 100 is represented as white light. That is, in one or more exemplary embodiment of the backlight of the display device according to the invention, the green light and the magenta light are not divided but are instead uniformly mixed to be emitted such that the color separation and the color blurring may be reduced or effectively prevented.

Next, an arrangement of the backlight of a display device according to the invention will be described with reference to FIG. 4.

Figure 4:
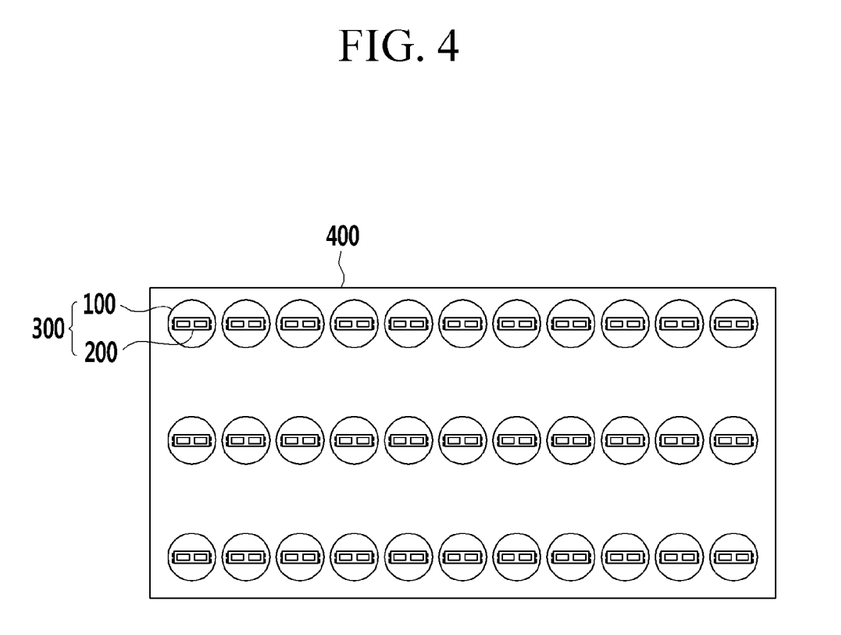
FIG. 4 is a top plan view of an exemplary embodiment of an arrangement of the backlight in a display device according to the invention.

FIG. 4 is a top plan view of an exemplary embodiment of an arrangement of the backlight in a display device, according to the invention.

The backlight 300 of the display device is disposed under a display panel 400, in a cross-section of a display device, thereby being used as a direct type of backlight.

A collective backlight member may include a plurality of backlights 300. The backlights 300 may each be considered a discrete backlight 300. In a plan view, the plurality of discrete backlights 300 may be disposed in a row direction and a column direction with a predetermined interval, in a matrix shape. That is, in the process in which the light emitted from the light-emitting device 200 of each backlight 300 passes through the lens 100 thereof, uniform emission of light may be achieved and color separation may not be generated such that the color blurring may be reduced or effectively prevented. By disposing the plurality of discrete backlights 300 at the constant interval and supplying the light to the display panel 400, the color reproducibility of a display device including such backlight member may be further improved.

Next, another exemplary embodiment of a backlight of a display device according to the invention will be described with reference to FIG. 5.

Figure 5:
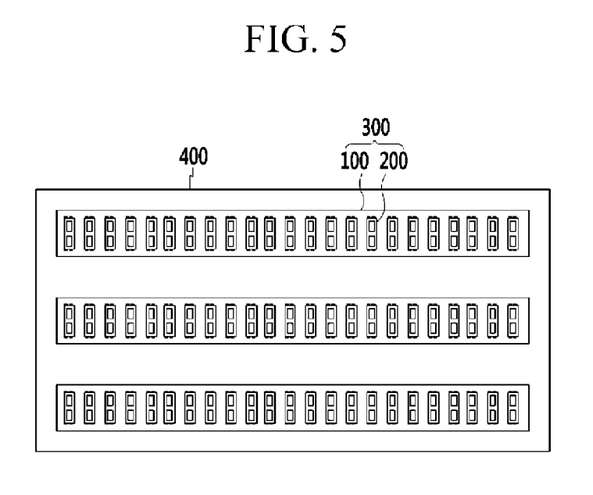
FIG. 5 is a top plan view of an arrangement of another exemplary embodiment of a backlight in a display device according to the invention.

FIG. 5 is a top plan view of an arrangement of another exemplary embodiment of a backlight in a display device, according to the invention.

The exemplary embodiment of the backlight of a display device shown in FIG. 5 is almost the same as the exemplary embodiment of the backlight of a display device shown in FIG. 1 to FIG. 4, such that the overlapping description is omitted. The exemplary embodiment of the backlight of a display device in FIG. 5 is different from the previous exemplary embodiment in a plane shape of the lens, and this difference will now be described.

In the previous exemplary embodiment, the lens 100 has the approximate cylinder or truncated circular cone shape such that the plane shape of the lens 100 is circular. However in the exemplary embodiment illustrated in FIG. 5, the lens 100 has a cuboid shape such that the lens has a bar shape in the plan view. In the exemplary embodiment of FIG. 5, a cross-sectional shape of the backlight 300 of the display device is the same as that shown in FIG. 2 of the previous exemplary embodiment. That is, FIG. 2 is a cross-sectional view of the backlight 300 of the display device of FIG. 4 taken along a horizontal direction of FIG. 4, and is a cross-sectional view of the backlight 300 of the display device of FIG. 5 taken along a vertical direction of FIG. 5.

In the previous exemplary embodiment, one light-emitting device 200 is disposed in the groove portion of one lens 100. That is, referring to FIG. 1 to FIG. 4, the light-emitting device 200, the groove portion 130 and the lens 100 are in a one-to-one correspondence. However in the exemplary embodiment illustrated in FIG. 5, a plurality of light-emitting devices 200 are disposed in the groove portion of one lens 100. In the illustrated exemplary embodiment, one continuous groove portion may be defined in one lens 100 and a plurality of light-emitting devices 200 may be disposed in the one continuous groove portion. The lens 100 is elongated in a first (e.g., horizontal of FIG. 5) direction, and the continuous groove portion may also be elongated in the first direction. A width of the groove portion (e.g., horizontal of FIG. 2) may be taken in a second (e.g., vertical of FIG. 5) direction, where the two LED chips 210 and 220 are adjacent in the width direction of the groove portion.

In an alternative exemplary embodiment, a plurality of discrete groove portions may be defined in one lens 100, and one light-emitting device 200 among a plurality of light-emitting devices 200 may be disposed in each discrete groove portion among the plurality of groove portions. Again, while the one lens 100 is elongated in the first (e.g., horizontal of FIG. 5) direction, the two LED chips 210 and 220 would be adjacent in the width direction of each discrete groove portion defined in the one lens 100.

In the illustrated exemplary embodiment of FIG. 5, a plurality of backlights 300 elongated in the row (e.g., horizontal) direction, each including one lens 100 and a plurality of light-emitting devices 200, may be arranged in the column (e.g., vertical) direction with the constant interval. Alternatively, where a long side of the plurality of backlights 300 is elongated in the vertical direction, a plurality of backlights 300 may be arranged in the row direction with the constant interval.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A lens for a backlight of a display device, comprising:
a lower surface disposed in a plane;
a groove portion defined recessed from the plane in which the lower surface is disposed and comprising a curved surface defined by a convexly curved portion provided in plural; and
an upper surface facing the lower surface, for which a distance from the plane in which the lower surface is disposed decreases in a direction from an outer edge of the lens to a center of the lens,
wherein
from among the plural convexly curved portions, a first convexly curved portion is disposed at the center of the lens and a second convexly curved portion is disposed at a first side of the first convexly curved portion,
each of the first and second convexly curved portions defines a distal end thereof closest to the plane in which the lower surface is disposed, the distal end disposed spaced apart from the plane in which the lower surface is disposed, and
the distal end of the first convexly curved portion at the center of the lens is closer to the plane in which the lower surface is disposed than the distal end of the second curved portion at the first side of the first convexly curved portion.

2. The lens of claim 1, wherein
the curved surface of the groove portion comprises three convexly curved portions.

3. The lens of claim 2, wherein from among the plural convexly curved portions:
a third convexly curved portion is disposed at a second side opposite to the first side of the first convexly curved portion.

4. The lens of claim 3, wherein
for each of the second and third convexly curved portions, from a boundary thereof with the first convexly curved portion, a distance between the plane in which the lower surface is disposed and the second and third convexly curved portions, respectively, decreases to a center of the second and third convexly curved portions, and
the distal end of the first convexly curved portion at the center of the lens is closer to the plane in which the lower surface is disposed than the distal end of the third convexly curved portion.

5. The lens of claim 1, wherein
in the plan view, the lens for the backlight of the display device has a circular shape or a bar shape.

6. A backlight for a display device comprising:
a lens comprising:
a lower surface;
a groove portion defined recessed from the lower surface and comprising a curved surface comprising a plurality of protrusions each of which is convexly curved toward a plane in which the lower surface is disposed, wherein a boundary is respectively defined where adjacent protrusions meet; and
an upper surface facing the lower surface and comprising an outer edge and a center, in a plan view, of which a distance from the lower surface decreases in a direction from the outer edge to the center; and
a light-emitting device comprising a light emitting diode chip, in the groove portion of the lens, the light emitting diode chip comprising an outer edge and a center in the plan view,
wherein
among the plurality of protrusions which are convexly curved toward the plane in which the lower surface is disposed, a first protrusion is at a center of the groove portion and a second protrusion is directly adjacent to the first protrusion at a first side thereof,
the second protrusion is disposed further from the plane in which the lower surface is disposed than the first protrusion which is at the center of the groove portion, and
a boundary where the first and second protrusions meet is at the center of the light emitting diode chip.

7. The backlight of claim 6, wherein
the curved surface of the groove portion comprises three protrusions.

8. The backlight of claim 7, wherein
among the three protrusions which are convexly curved toward the plane in which the lower surface is disposed, a third protrusion is at a second side opposite to the first side of the first protrusion at which the first protrusion is disposed.

9. The backlight of claim 8, wherein
each of the first to third protrusions defines a distal end thereof closest to the plane in which the lower surface is disposed, the distal end disposed spaced apart from the plane in which the lower surface is disposed, and
a distance from the distal end of the first protrusion to the plane in which the lower surface is disposed, is less than a distance from the distal end of the second protrusion and the third protrusion to the plane in which the lower surface is disposed.

10. The backlight of claim 9, wherein
the light emitting diode chip is provided in plural in the groove portion of the lens and comprises a first light emitting diode chip and a second light emitting diode chip.

11. The backlight of claim 10, wherein
the light-emitting device further comprises a phosphor on the second light emitting diode chip.

12. The backlight of claim 11, wherein
the first light emitting diode chip is a green light emitting diode chip, the second light emitting diode chip is a blue light emitting diode chip, and the phosphor is a red phosphor.

13. The backlight of claim 10, wherein
the boundary where the first protrusion and the second protrusion meet is within a radius of about 500 micrometers from the center of the first light emitting diode chip.

14. The backlight of claim 13, wherein
the boundary where the first protrusion and the second protrusion meet is at the center of the first light emitting diode chip.

15. The backlight of claim 10, wherein
a boundary where the first protrusion and the third protrusion is within a radius of about 500 micrometers from the center of the second light emitting diode chip.

16. The backlight of claim 15, wherein
the boundary where the first protrusion and the third protrusion meet is at the center of the second light emitting diode chip.

17. The backlight of claim 10, wherein in the plan view, a center of the first protrusion is within a radius of about 500 micrometers from a center defined between the first light emitting diode chip and the second light emitting diode chip.

18. The backlight of claim 17, wherein the center of the first protrusion is at the center defined between the first light emitting diode chip and the second light emitting diode chip.

19. The backlight of claim 6, wherein in the plan view, the lens has a circular shape.

20. The backlight of claim 6, wherein in the plan view, the lens and the groove portion has a bar shape, and further comprising a plurality of light-emitting devices in the groove portion.

\* \* \* \* \*